(12) United States Patent
Hiramoto et al.

(10) Patent No.: US 10,621,889 B2
(45) Date of Patent: Apr. 14, 2020

(54) MAP DISPLAY SYSTEM AND MAP DISPLAY PROGRAM

(71) Applicant: AISIN AW CO., LTD., Anjo-shi, Aichi-ken (JP)

(72) Inventors: Naoyuki Hiramoto, Takahama (JP); Yoshihiro Ishihara, Okazaki (JP)

(73) Assignee: AISIN AW CO., LTD., Anjo-shi, Aichi (JP)

( * ) Notice: Subject to any disclaimer, the term of this patent is extended or adjusted under 35 U.S.C. 154(b) by 0 days.

(21) Appl. No.: 16/086,731

(22) PCT Filed: May 17, 2017

(86) PCT No.: PCT/JP2017/018507
§ 371 (c)(1),
(2) Date: Sep. 20, 2018

(87) PCT Pub. No.: WO2017/199999
PCT Pub. Date: Nov. 23, 2017

(65) Prior Publication Data
US 2019/0130793 A1 May 2, 2019

(30) Foreign Application Priority Data
May 20, 2016 (JP) .................................. 2016-101298

(51) Int. Cl.
*G09B 29/10* (2006.01)
*G06T 11/60* (2006.01)
(Continued)

(52) U.S. Cl.
CPC ......... *G09B 29/10* (2013.01); *G01C 21/3673* (2013.01); *G06T 11/203* (2013.01);
(Continued)

(58) Field of Classification Search
None
See application file for complete search history.

(56) References Cited

U.S. PATENT DOCUMENTS 6,025,851 A * 2/2000 Valdes .................. G06T 11/203
345/442
2007/0021911 A1 1/2007 Kikuchi et al.
(Continued)

FOREIGN PATENT DOCUMENTS

EP 0 652 418 A1 5/1995
EP 1 710 713 A1 10/2006
(Continued)

OTHER PUBLICATIONS

International Search Report of PCT/JP2017/018507 dated Jul. 4, 2017.
(Continued)

*Primary Examiner* — YuJang Tswei
(74) *Attorney, Agent, or Firm* — Sughrue Mion, PLLC

(57) ABSTRACT

There is provided a technique for arranging characters along a road to improve appearance and readability. A map display system arranges a plurality of characters along a road line which is a polyline representing a road shape, and includes an arranging part that arranges, at a connecting portion where a first road line segment and a second road line segment forming the road line are connected, a third character in a third direction between a first character arranged in a first direction and a second character arranged in a second direction, the first direction being a direction for the first road line segment, the second direction being a direction for the second road line segment, and the third direction being a direction between the first direction and the second direction; and a display control part that displays the road line and the plurality of characters on a display part.

9 Claims, 6 Drawing Sheets

(51) Int. Cl.
   *G01C 21/36* (2006.01)
   *G09B 29/00* (2006.01)
   *G06T 11/20* (2006.01)
   *G01C 21/26* (2006.01)

(52) U.S. Cl.
   CPC ............ G06T 11/60 (2013.01); G09B 29/003 (2013.01); G01C 21/26 (2013.01)

(56) References Cited

U.S. PATENT DOCUMENTS

| | | |
|---|---|---|
| 2008/0097692 A1 | 4/2008 | Fukumoto et al. |
| 2008/0231643 A1 | 9/2008 | Fletcher et al. |
| 2009/0022426 A1* | 1/2009 | Yamazaki .......... G01C 21/3673 382/296 |
| 2013/0002678 A1* | 1/2013 | Cornell .................. G06T 11/20 345/467 |
| 2013/0100138 A1* | 4/2013 | Moriyanna ........... G06T 11/203 345/442 |
| 2013/0321429 A1 | 12/2013 | Miyamoto |
| 2016/0140756 A1* | 5/2016 | Kishikawa .............. G06T 17/05 345/422 |
| 2017/0284812 A1* | 10/2017 | Kim ....................... G01C 21/30 |

FOREIGN PATENT DOCUMENTS

| | | |
|---|---|---|
| JP | 05-269956 A | 10/1993 |
| JP | 08-194432 A | 7/1996 |
| JP | 2008-102002 A | 5/2008 |
| JP | 2015-055738 A | 3/2015 |

OTHER PUBLICATIONS

Communication dated Feb. 14, 2019, from the European Patent Office in counterpart European Application No. 17799423.3.

* cited by examiner

MAP DISPLAY SYSTEM AND MAP DISPLAY PROGRAM

CROSS REFERENCE TO RELATED APPLICATIONS

This application is a National Stage of International Application No. PCT/JP2017/018507 filed May 17, 2017, claiming priority based on Japanese Patent Application No. 2016-101298 filed May 20, 2016.

TECHNICAL FIELD

The present application relates to a map display system and a map display program.

BACKGROUND ART

There is known a technique for displaying a road name along a road (see Patent Literature 1). In Patent Literature 1, a linear road portion of a road serves as a portion where a road name is displayed.

CITATION LIST

Patent Literature

Patent Literature 1: JP 2008-102002 A

SUMMARY

Technical Problems

However, there may be no linear road portion, and thus, there has been a case in which a road name needs to be displayed along a curved road portion. When a road name is displayed along a greatly curved portion, characters forming the road name have great differences in direction, causing a problem that the appearance and readability of the road name become poor.

The aspects of the application relate to the above-described problem, and provides a technique capable of arranging characters along a road so as to improve appearance and readability.

Solutions to Problems

To provide the above-described technique, a map display system of an exemplary embodiment is a map display system that arranges a plurality of characters along a road line, the road line being a polyline representing a road shape, and includes: an arranging part that arranges, at a connecting portion where a first road line segment and a second road line segment are connected, a third character in a third direction between a first character arranged in a first direction and a second character arranged in a second direction, the first direction being a direction for the first road line segment, the second direction being a direction for the second road line segment, the third direction being a direction between the first direction and the second direction, and the first road line segment and the second road line segment forming the road line; and a display control part that displays the road line and the plurality of characters on a display part.

To provide the above-described technique, a map display program of an exemplary embodiment causes a computer to function as: an arranging part that arranges, at a connecting portion where a first road line segment and a second road line segment are connected, a third character in a third direction between a first character arranged in a first direction and a second character arranged in a second direction, the first direction being a direction for the first road line segment, the second direction being a direction for the second road line segment, the third direction being a direction between the first direction and the second direction, and the first road line segment and the second road line segment forming a road line; and a display control part that displays the road line and a plurality of characters on a display part.

In the above-described configurations, at the connecting portion where the first road line segment and the second road line segment are connected, the third character is arranged in the third direction which is between the first direction and the second direction, between the first character in the first direction for the first road line segment and the second character in the second direction for the second road line segment. By thus arranging the third character in the third direction which is between the first direction and the second direction, between the first character in the first direction and the second character in the second direction, differences between the directions of consecutive characters can be reduced over a case in which the third character is arranged in the first direction or the second direction. Therefore, the appearance and readability of a character string can be improved.

To provide the above-described technique, a map display system of an exemplary embodiment includes: a reference line obtaining part that obtains such a reference line that a first road line segment and a second road line segment are linked by a link curve at a connecting portion where the first road line segment and the second road line segment are connected, the first road line segment and the second road line segment forming a road line, and the link curve being a part of a circumference of a circle or an ellipse in contact with the first road line segment and the second road line segment; an arranging part that arranges a plurality of characters on the reference line in certain directions with respect to the reference line; and a display control part that displays the road line and the plurality of characters on a display part.

To provide the above-described technique, a map display program of an exemplary embodiment causes a computer to function as: a reference line obtaining part that obtains such a reference line that a first road line segment and a second road line segment are linked by a link curve at a connecting portion where the first road line segment and the second road line segment are connected, the first road line segment and the second road line segment forming a road line, and the link curve being a part of a circumference of a circle or an ellipse in contact with the first road line segment and the second road line segment; an arranging part that arranges a plurality of characters on the reference line in certain directions with respect to the reference line; and a display control part that displays the road line and the plurality of characters on a display part.

In the above-described configurations, since the link curve which is a part of the circumference of a circle or an ellipse in contact with the first road line segment and the second road line segment is a smooth curve, the first road line segment and the second road line segment can be linked while a direction is changed slowly. In particular, since the reference line is tangent to the link curve, a change in direction at a connecting portion between the reference line and the link curve can be suppressed. Therefore, differences between the directions of a plurality of characters arranged in certain directions with respect to the reference line can be suppressed. Hence, appearance and readability can be improved.

DESCRIPTION OF EMBODIMENTS

Here, embodiments of the present application will be described in the following order:
(1) Configuration of a navigation system;
(2) Map display process; and
(3) Other embodiments.

(1) Configuration of a Navigation System

Figure 1:
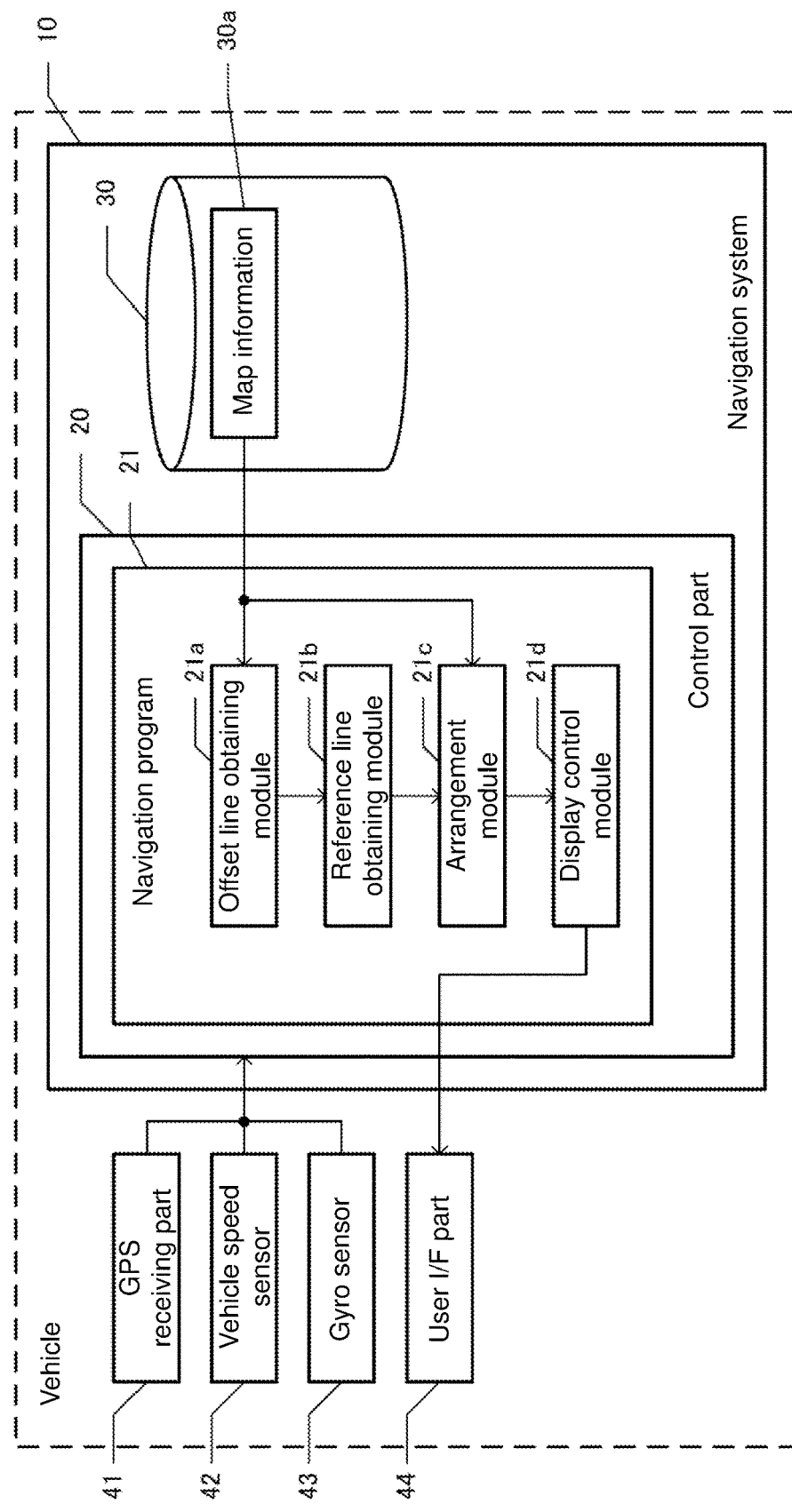
FIG. 1 is a block diagram of a navigation system.

FIG. 1 is a block diagram showing a configuration of a navigation system 10 serving as a map display system according to one embodiment. The navigation system 10 is provided in a vehicle. The navigation system 10 includes a control part 20 and a recording medium 30. The control part 20 includes a CPU, a RAM, a ROM, etc., and executes a navigation program 21 stored in the recording medium 30 or the ROM.

The recording medium 30 has map information 30a recorded therein. The map information 30a includes, for example, link data that identifies a link that connects two nodes, and node data representing the locations of the nodes, etc. The link corresponds to a road section in which the vehicle can travel, and the nodes correspond to intersections which are the endpoints in a length direction of the link. The node data includes information about the intersections corresponding to the nodes. The link data includes shape interpolation point data representing the locations of shape interpolation points set at the center in a width direction of the link. The link data includes information indicating a mute name of a route formed by the link. A plurality of consecutive links form a single route, and the route name is recorded so as to be associated with the links.

The vehicle includes a GPS receiving part 41, a vehicle speed sensor 42, a gyro sensor 43, and a user I/F part 44. The GPS receiving part 41 receives radio waves from GPS satellites, and outputs a signal for calculating a current vehicle location, through an interface which is not shown. The vehicle speed sensor 42 outputs a signal corresponding to the rotational speed of wheels provided on the vehicle. The control part 20 obtains a vehicle speed based on the signal from the vehicle speed sensor 42. The gyro sensor 43 detects angular acceleration for a turn in a horizontal plane of the vehicle, and outputs a signal corresponding to vehicle's orientation. The control part 20 obtains a vehicle's traveling direction based on the signal from the gyro sensor 43. The control part 20 obtains a current vehicle location by identifying a vehicle's traveling path based on the output signals from the vehicle speed sensor 42, the gyro sensor 43, and the like. The output signal from the GPS receiving part 41 is used, for example, to correct the current vehicle location identified by the vehicle speed sensor 42, the gyro sensor 43, and the like.

The user I/F part 44 is an interface part for providing various types of information to a user or accepting, as input, user's instructions. In the present embodiment, the user I/F part 44 includes a touch panel display and a speaker that outputs audio, which are not shown. The touch panel display is a display part, and displays a map. The control part 20 outputs control signals to the user I/F part 44 to output an arbitrary image and audio. In addition, the control part 20 obtains user operations based on touch operations on the touch panel display.

The navigation program 21 corresponds to a map display program. The navigation program 21 includes an offset line obtaining module 21a, a reference line obtaining module 21b, an arrangement module 21c, and a display control module 21d. The offset line obtaining module 21a, the reference line obtaining module 21b, the arrangement module 21c, and the display control module 21d are program modules that cause the control part 20 serving as a computer to function as an offset line obtaining part, a reference line obtaining part, an arranging part, and a display control obtaining part, respectively.

By the function of the offset line obtaining module 21a, the control part 20 obtains a road line which is a polyline representing a road shape. First, by the function of the offset line obtaining module 21a, the control part 20 renders a map to be displayed on the touch panel display, based on the map information 30a and obtains the location and shape of a road included in the map, based on the map information 30a. The location and shape of the road are the location and shape of a road line which is a polyline connecting, in turn, nodes and shape interpolation points which are consecutively set on the road.

Figure 2A:
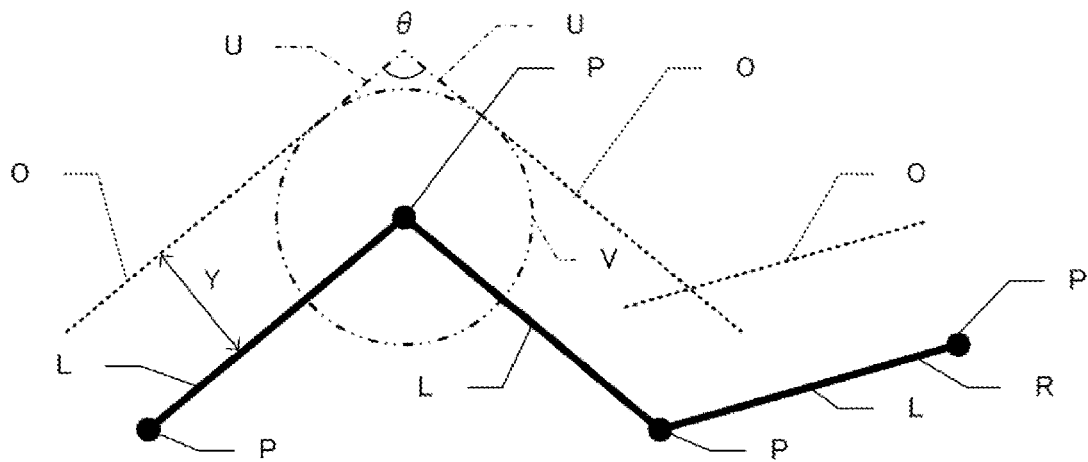
FIGS. 2A to 2C are examples of a map.

FIG. 2A shows an example of a map. A road line R includes a plurality of line segments L (solid lines) connecting road points P (filled circles) which are points obtained by plotting nodes or shape interpolation points on the map. The line segments L are lines that connect the road points P consecutively present on the road and that pass through the center in a width direction of the road. By the function of the reference line obtaining module 21b, the control part 20 obtains the road line R based on the node data and shape interpolation point data included in the map information 30a.

By the function of the offset line obtaining module 21a, the control part 20 obtains offset lines O that are offset from the respective line segments L forming the road line R. By the function of the offset line obtaining module 21a, the control part 20 obtains offset lines O (broken lines) which are lines obtained by parallelly moving each of the line segments L forming the road line R a certain offset distance Y in a direction perpendicular to the line segment L. The offset distance Y may be set based on the size of characters representing a route name of the road, or may be set to the magnitude of a length that is one-half or more (a factor of 0.5 to 1.0, etc.) of the length in a longitudinal or transverse direction of the characters.

By the function of the reference line obtaining module 21b, the control part 20 obtains a reference line which is a polyline formed by linking two consecutive offset lines O through one or more link straight lines, and sets the link straight lines such that each of two or more bending angles of the reference line is closer to 180 degrees than an angle formed by the two offset lines O. The two consecutive offset lines O are such two offset lines O that line segments L of the road line R which are offset sources of the two offset lines O are connected to a single road point P and that the vehicle can continuously pass through the line segments L of the road line R which are the offset sources.

Figure 2B:
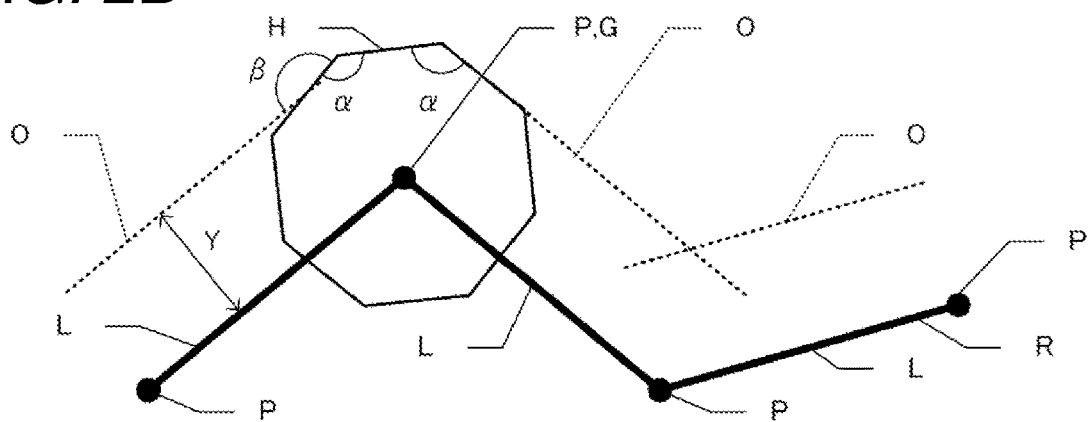
Figure 2C:
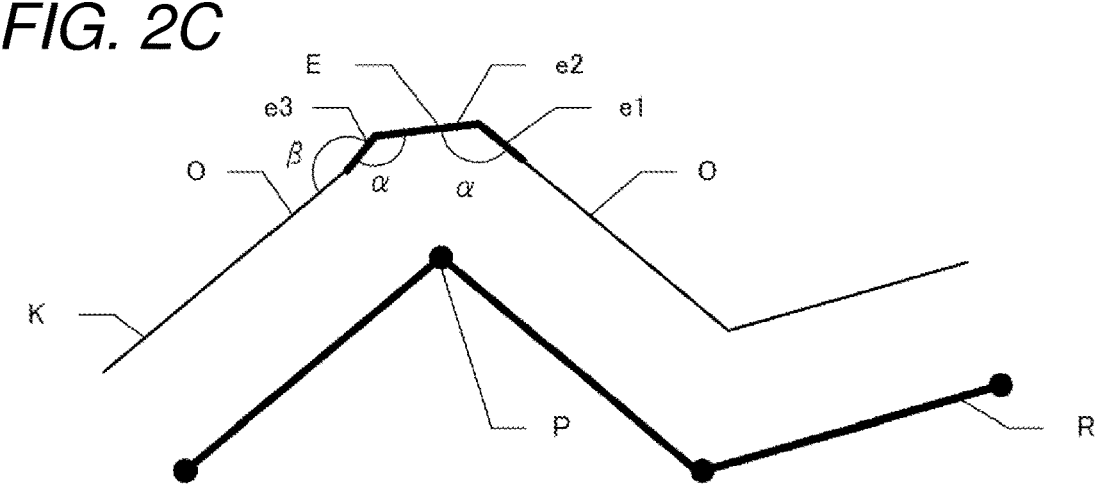

FIGS. 2B and 2C are maps for describing a reference line. When two consecutive offset lines O do not intersect each other like the first and second offset lines O from the left in FIGS. 2B and 2C, by the function of the reference line obtaining module 21b, the control part 20 sets a regular polygon that links the two consecutive offset lines O by its outline. By the function of the reference line obtaining module 21b, the control part 20 sets, as a link graphic H, such a regular octagon that the length of a perpendicular dropped from a center G to each side is the offset distance Y. The control part 20 sets the center G (the center of mass) of the link graphic H at a road point P which is a point of intersection of line segments L which are offset sources of the two offset lines O linked by the link graphic H. Note that the link graphic H has a center at the road point P which is the point of intersection of the line segments L which are the offset sources of the two consecutive offset lines O, and circumscribes a link circle V (dashed-double-dotted line in FIG. 2A) which is in contact with each of the two offset lines O. The radius of the link circle V is the offset distance Y.

The link graphic H may be any graphic as long as the direction of the outline (sides) can be calculated, and is not limited to a regular octagon. In the present embodiment, by the function of the reference line obtaining module 21b, the control part 20 obtains a link graphic H that is rotated such that any of the sides of the link graphic H is parallel to (overlaps) one of the two consecutive offset lines O. In the link graphic H, one side does not need to be set in a direction parallel to an offset line O and may be set, for example, in a predetermined direction. Since the link graphic H circumscribes the link circle V with which each of the two consecutive offset lines O is in contact, regardless of in which direction the link graphic H is rotated, the two offset lines O intersect or come into contact with any of the sides of the link graphic H.

By the function of the reference line obtaining module 21b, the control part 20 cuts off the two consecutive offset lines O and the link graphic H at points of intersection thereof, and discards a portion of the offset lines O inside the link graphic H and one of two cut-off portions of the link graphic H closer to the road line R. Then, as shown in FIG. 2C, the control part 20 obtains a reference line K formed by combining together a part of the offset lines O and a part of the link graphic H that remain without being discarded. The reference line K is a continuous line along the road line R. As a result, the two consecutive offset lines O are linked by a link line E which is a part of the link graphic H. The link line E includes one or more link straight lines e1 to e3 that form a part of the outline of the regular octagon (link graphic H).

In addition, the reference line K (each of portions corresponding to the two offset lines O which are linked by the link straight lines e1 to e3) has two or more bending angles. The two or more bending angles include a bending angle α which is an interior angle of the link graphic H, and a bending angle β which is an angle sandwiched between the link straight line e1, e3 at an end and an offset line O. Note that in FIG. 2C since the link graphic H is rotated such that a side of the link graphic H that serves as the link straight line e1 at a right end and an offset line O to which the link straight line e1 is connected have the same direction, an angle formed by the link straight line e1 at the right end and the offset line O is 0 degrees. When the link graphic H is a regular octagon, the interior angle (bending angle α) of the link graphic H is 135 degrees. Here, as shown in FIG. 2A, an angle formed by extended lines U (dashed-dotted line) obtained by extending two consecutive offset lines O (an angle smaller than 180 degrees) is defined as an initial angle θ.

In the present embodiment, when the interior angle α of the link graphic H is closer to 180 degrees than the initial angle θ, the control part 20 links the two consecutive offset lines O by the link graphic H. On the other hand, when the interior angle α of the link graphic H is not closer to 180 degrees than the initial angle θ, the control part 20 does not link the two consecutive offset lines O by the link graphic H. Specifically, the control part 20 obtains a reference line K formed by linking two consecutive offset lines O by extended lines U which are obtained by extending the two offset lines O. Hence, the reference line K (each of portions corresponding to the two offset lines O which are linked by the extended lines U) has only one bending angle.

As described above, the bending angle α which is an interior angle of the link graphic H is an angle closer to 180 degrees than the initial angle θ. In addition, the bending angle β which is an angle sandwiched between the link straight line e1, e3 at an end and an offset line O is also an angle closer to 180 degrees than the initial angle θ. That is, all bending angles α and β of the reference line K are angles closer to 180 degrees than the initial angle θ.

Figure 3A:
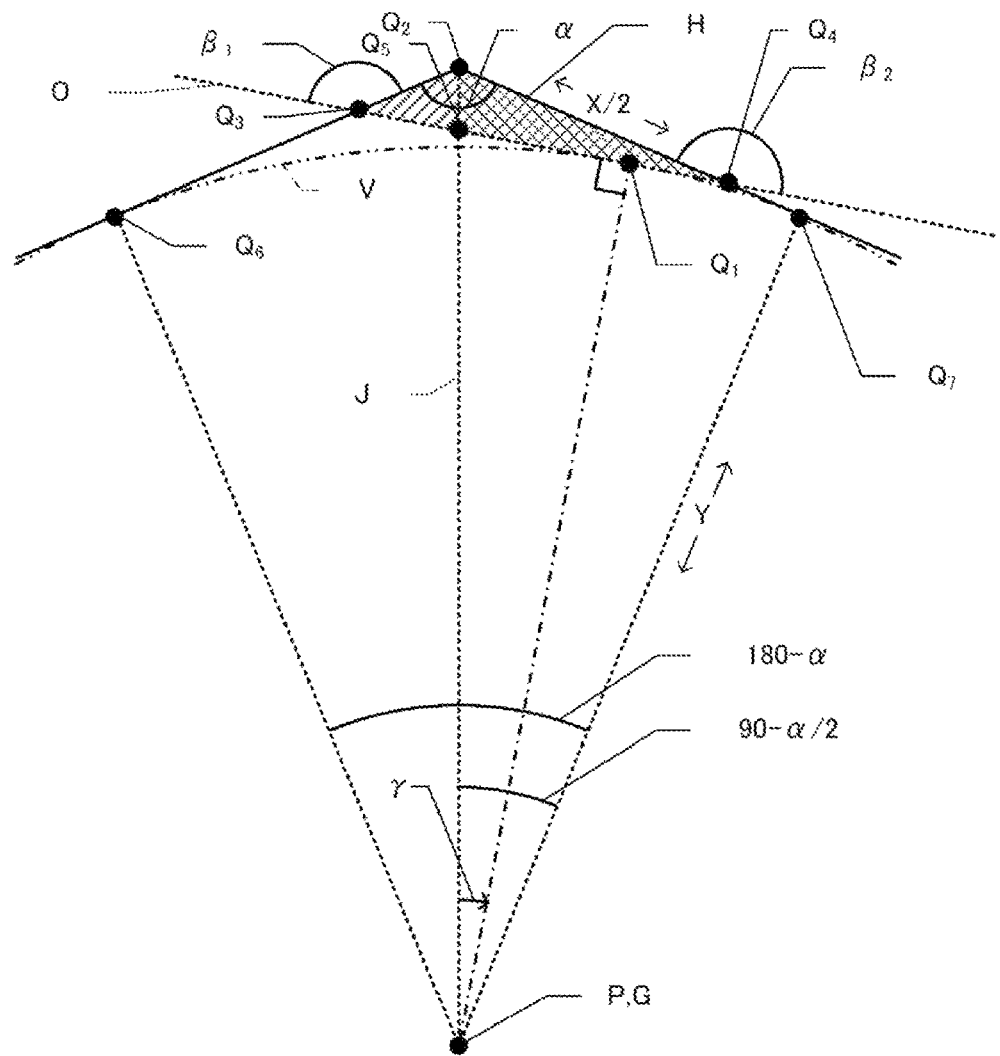
FIG. 3A is an example of a map and FIG. 3B is graphs of bending angles.

The fact that the bending angle α is an angle closer to 180 degrees than the initial angle θ will be described below using FIG. 3A. FIG. 3A is an enlarged view of a map showing a state in which a link graphic H intersects offset lines O. The link graphic H (a part of which is shown) has a center G located at a road point P which is a point of intersection of line segments L which are offset sources of two consecutive offset lines O, and circumscribes a link circle V (a part of which is shown) which is in contact with each of the two offset lines O. Here, attention is given to bending angles $\beta_1$ and $\beta_2$ which are angles at which an offset line O in contact with the link circle V at an arbitrary point of contact $Q_1$ on the circumference of the link circle V intersects sides of the link graphic H. The offset line O is a line segment having an endpoint at the point of contact $Q_1$ which is in contact with the circumference of the link circle V, but for convenience of description, the offset line O is shown by a straight line passing through the point of contact $Q_1$. In FIG. 3A, when the offset line O has a right endpoint at the point of contact $Q_1$, the bending angle $\beta_1$ is formed by the offset line O and the link graphic H. On the other hand, when the offset line O has a left endpoint at the point of contact $Q_1$, the bending angle $\beta_2$ is formed by the offset line O and the link graphic H.

Points of intersection of the link graphic H and the offset line O are defined as points $Q_3$ and $Q_4$, and a vertex of the link graphic H which is a point of intersection of two sides having the points $Q_3$ and $Q_4$ is defined as a point $Q_2$. In addition, points of intersection of the two sides having the points $Q_3$ and $Q_4$ which are the points of intersection of the link graphic H and the offset line O, and the link circle V are defined as points $Q_6$ and $P_7$. Furthermore, a line that connects the point $Q_2$ which is the vertex of the link graphic H to the center G is defined as a center line J. The magnitude of an angle $Q_1GQ_5$ formed by a straight line extending from the center G to the point of contact $Q_1$ between the offset line O and the link circle V and the center line J is defined as γ.

Since a triangle $Q_1Q_5G$ is a right triangle having one acute angle $Q_1GQ_5$ with a magnitude of γ, the angle $Q_1Q_5G$=90−γ

[degrees]. Since an angle $Q_2Q_5Q_3$ is a vertical angle to the angle $Q_1Q_5G$, the angle $Q_2Q_5Q_3=90-\gamma$ [degrees]. Since an angle $Q_3Q_2Q_5$ is one half of an interior angle $\alpha$ of the link graphic H, the angle $Q_3Q_2Q_5=\alpha/2$ [degrees]. Since the bending angle $\beta_1$ is an exterior angle of a triangle $Q_2Q_5Q_3$ (diagonal hatching), the bending angle $\beta_1=90+\alpha/2-\gamma$ [degrees]. Furthermore, since the sum of an angle $Q_2Q_3Q_4$ and the bending angle $\beta_1$ is 180 [degrees], the angle $Q_2Q_3Q_4=180-\beta_1=90-\alpha/2+\gamma$ [degrees]. Here, since the bending angle $\beta_2$ is an exterior angle of a triangle $Q_2Q_3Q_4$ (diagonal hatching+cross-hatching) and an angle $Q_4Q_2Q_3=a$, the bending angle $\beta_2=90+\alpha/2+\gamma$ [degrees].

Since a triangle $Q_2GQ_7$ is a right triangle having one acute angle which is one half of the interior angle $\alpha$ of the link graphic H, an angle $Q_2GQ_7=90-\alpha/2$ [degrees]. Therefore, $\gamma$ changes in a range of 0 to $(90-\alpha/2)$ [degrees]. Note that since the graphic is line-symmetric with respect to the center line J, even if the angle $\gamma$ changes in a negative range of $-(90-\alpha/2)$ to 0 [degrees], the magnitudes of the bending angles $\beta_1$ and $\beta_2$ are the same. Furthermore, since the link graphic H is rotationally symmetric about the center G every $180-\alpha$ [degrees], even in a range in which the absolute value of the angle $\gamma$ is greater than $90-\alpha/2$ [degrees], the magnitudes of the bending angles $\beta_1$ and $\beta_2$ are the same. Namely, regardless of which point on the circumference of the link circle V the offset line O is in contact with, the magnitudes of the bending angles $\beta_1$ and $\beta_2$ are represented by the above-described calculation formulas.

Figure 3B:
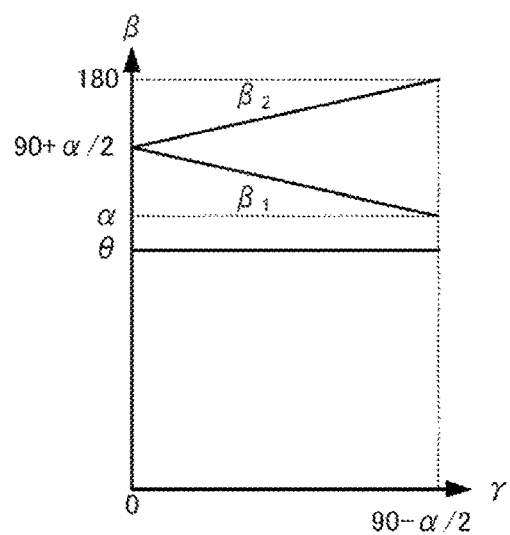

FIG. 3B is graphs of the bending angles $\beta_1$ and $\beta_2$. As shown in the drawing, when the angle $\gamma$ changes in a range of 0 to $(90-\alpha/2)$ [degrees], the bending angle $\beta_1$ changes in a range of a to $(90+\alpha/2)$ [degrees], and the bending angle $\beta_2$ changes in a range of $(90+\alpha/2)$ to 180 [degrees]. Since the interior angle $\alpha$ is an angle closer to 180 degrees than the initial degree 0, the bending angles $\beta_1$ and $\beta_2$ are angles that are always closer to 180 degrees than the initial angle $\theta$. Therefore, regardless of in which direction the offset line O intersects the link graphic H, all bending angles $\alpha$ and $\beta$ of the reference line K are angles closer to 180 degrees than the initial angle $\theta$. This relationship also holds true for when the link graphic H is a regular polygon other than a regular octagon.

Meanwhile, when two consecutive offset lines O originally intersect each other like the first and second offset lines O from the right in FIGS. 2A and 2B, by the function of the reference line obtaining module 21b, the control part 20 obtains a reference line K formed by cutting off the two offset lines O at a point of intersection thereof and discarding cut-off end portions. The end portions are portions whose distances to any of the line segments L are less than the offset distance Y. All bending angles of the reference line K do not necessarily need to be angles closer to 180 degrees than the initial angle $\theta$, and at least at a portion where the link straight lines e1 to e3 are set, the bending angles $\alpha$ and $\beta$ need to be angles closer to 180 degrees than the initial angle $\theta$.

By the function of the arrangement module 21c, the control part 20 arranges a plurality of characters on the reference line K in certain directions with respect to the reference line K. Specifically, by the function of the arrangement module 21c, the control part 20 obtains a route name of a road corresponding to the road line R from the link data included in the map information 30a, and obtains text images of respective characters forming the route name from font data which is not shown.

Figure 4A:
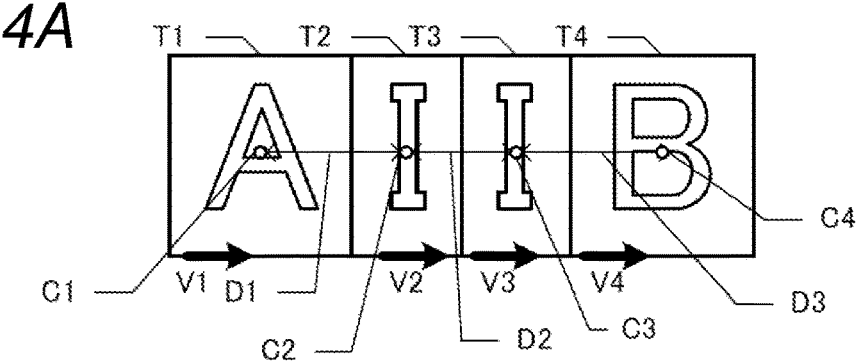
FIGS. 4A and 4B are diagrams showing arrangement of characters and FIG. 4C is a flowchart of a map display process.

FIG. 4A is a diagram showing text images T1 to T4 of a plurality of characters "AIIB" forming a route name. The text images T1 to T4 are rectangular images. The length in a longitudinal direction of the text images T1 to T4 is common between the characters, and the length in a transverse direction of the text images T1 to T4 can vary between the characters. The centers of mass of the text images T1 to T4 are defined as center points C1, and the directions of bases of the text images T1 to T4 are defined as directions V1 to V4 of the characters represented by the text images T1 to T4. By the function of the arrangement module 21c, the control part 20 sets the center points C1 and the directions V1 to V4 on the map, and thereby arranges the characters. Note that portions of the text images T1 to T4 other than the characters are transparent images, and the outlines of the text images T1 to T4 are also actually transparent.

Figure 4B:
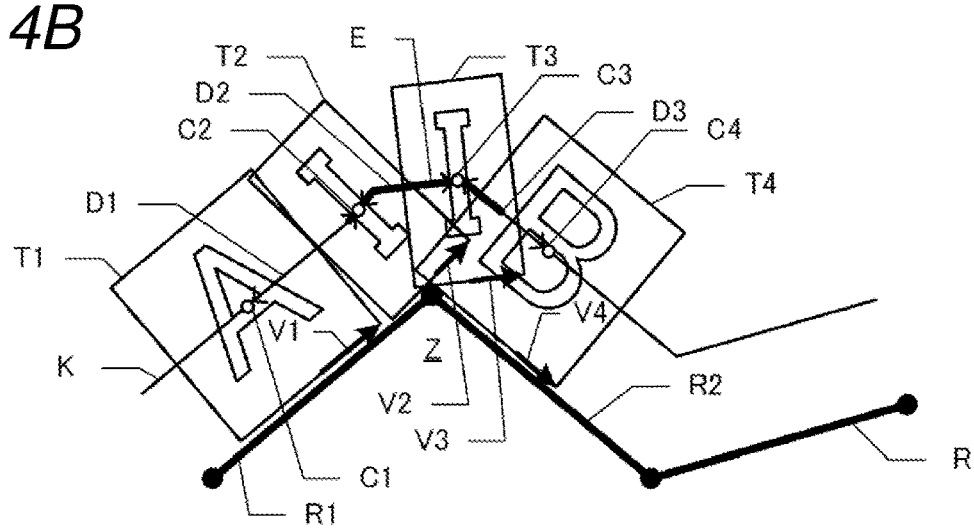

As shown in FIG. 4B, by the function of the arrangement module 21c, the control part 20 arranges the center points C1 to C4 of the text images T1 to T4 on the reference line K to allow the directions of portions of the reference line K at the center points C1 to C4 to coincide with the directions V1 to V4 of the respective characters. Namely, the control part 20 performs arrangement such that the directions V1 to V4 of the respective characters are certain directions (parallel) with respect to the directions of corresponding portions of the reference line K. Distances (distances on the reference line K) between the center points C1 to C4 of the text images T1 to T4 which are consecutively arranged in a direction along the road line R are spacings D1 to D3.

As shown in FIG. 4A, the spacings D1 to D3 are spacings between the consecutive center points C1 to C4 for when the text images T1 to T4 are arranged in the transverse direction with no clearance therebetween. That is, the spacing D1 between the center points C1 and C2 is one-half of a total value of the lengths in the transverse direction of the text images T1 and T2, the spacing D2 between the center points C2 and C3 is one-half of a total value of the lengths in the transverse direction of the text images T2 and T3, and the spacing D3 between the center points C3 and C4 is one-half of a total value of the lengths in the transverse direction of the text images T3 and T4, As shown in FIG. 4A, the lengths in the transverse direction of the respective text images T1 to T4 are set such that the spacings between the characters are perceived to be equal when the text images T1 to T4 are arranged with no clearance therebetween.

Note that the center points C1 to C4 may be arranged in any position on the reference line K as long as the spacings D1 to D3 are being secured. For example, the control part 20 may arrange the center points C1 to C4 such that the text images T3 and T4 are arranged in a position as far away as possible from road lines R of other roads or other display objects (icons representing facilities, etc.). Specifically, the control part 20 may arrange the center points C1 to C4 in a position midway between two other road lines R intersecting the road line R. In addition, the control part 20 may arrange the center points C1 to C4 in a position with the highest degree of linearity of the reference line K.

By the function of the display control module 21d, the control part 20 displays the road line R and the plurality of characters on the display part. Namely, when the arrangement of each character is completed, by the function of the display control module 21d, the control part 20 renders a map including the road line R and the text images T1 to T4, and displays the map on the touch panel display. By this, a route name represented by the text images T1 to T4 can be displayed along the road line R.

In the above-described configuration of the present embodiment, a reference line K which is a polyline formed by linking two consecutive offset lines O through one or more link straight lines e1 to e3 is obtained, and the link straight lines e1 to e3 are set such that each of two or more bending angles α and (of the reference line K is closer to 180 degrees than an initial angle θ formed by the two offset lines O. By arranging a plurality of characters on the reference line K formed based on a road line R in certain directions with respect to the reference line K, the characters can be arranged along a road. Here, by linking the two offset lines O by one or more link straight lines e1 to e3, the reference line K having two or more bending angles α and β is formed. Then, by setting each of the bending angles α and β of the reference line K to be closer to 180 degrees than an angle formed by the two offset lines, differences between the directions of line segments forming the reference line K (the two consecutive offset lines O and the one or more link straight lines e1 to e3) can be suppressed. By suppressing the differences between the directions of the line segments forming the reference line K, differences between the directions V1 to V4 of the plurality of characters arranged in the directions of corresponding portions of the reference line K can be suppressed, enabling to improve appearance and readability.

In the above-described configuration of the present embodiment, it can be put in another way: as shown in FIG. 4B, by the function of the arrangement module 21c, the control part 20 arranges, at a connecting portion Z where a first road line segment R1 and a second road line segment R2 are connected, a third character (T3) in a third direction (V3) which is a direction between a first direction (V) which is a direction for the first road line segment R1 and a second direction (V4) which is a direction for the second road line segment R2, between a first character (T1) arranged in the first direction (V1) and a second character (T4) arranged in the second direction (V4), the first road line segment R1 and the second road line segment R2 forming the road line R. In addition, the first direction (V1) and the second direction (V4) are directions for the first road line segment R1 and the second road line segment R2, respectively, and the third direction (V3) is a direction for the link line E (link straight line e2) which is a link line segment. By thus arranging the third character (T3) in the third direction (V3) which is a direction between the first direction (V1) and the second direction (V4) between the first character (T1) and the second character (T4), differences between the directions V1 to V4 of the plurality of characters can be suppressed, enabling to improve appearance and readability.

The control part 20 sets a regular polygon that links two consecutive offset lines O by its outline. By this, the magnitudes of bending angles α sandwiched between the link straight lines e1 to e3 can be equalized, enabling to equally distribute changes in the direction of the reference line K.

Note that the link graphic H may be set such that a section corresponding to each of the spacings D1 to D3 between the center points C1 to C4 of the text images T1 to T4 possibly can have only one each of bending angles α and β. Here, the length of a side $Q_2Q_7$ of the right triangle $Q_2Q_7G$ of FIG. 3A is defined as X. In the right triangle $Q_2Q_7G$, $Y/X=\tan(\alpha/2)$ and the length X of the side $Q_2Q_7=Y/\tan(\alpha/2)$. Since the length of one side of the link graphic H is twice the length X of the side $Q_2Q_7$, the length 2× of one side of the link graphic $H=2Y/\tan(\alpha/2)$. Therefore, the link graphic H having an interior angle α at which $2Y/\tan(\alpha/2)$ is greater than the average value or minimum value of the spacings D1 to D3 is set.

(2) Map Display Process:

Next, a map display process which is performed by the function of the navigation program 21 will be described. The map display process of the present embodiment is a process performed when a map is newly displayed or when there is a change in the location or scale of a map already displayed.

Figure 4C:
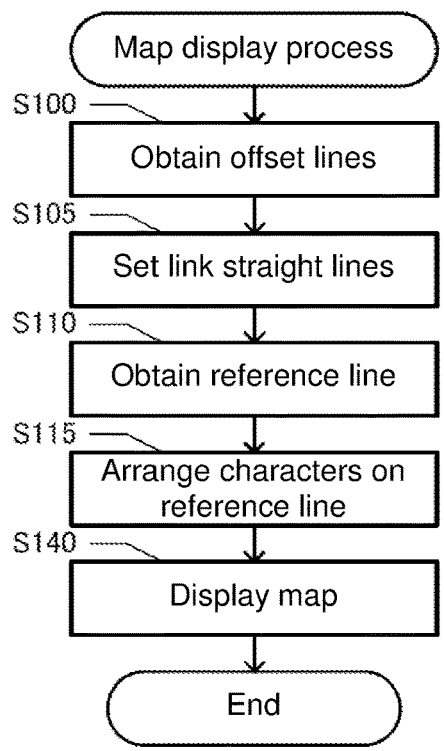

FIG. 4C is a flowchart of a map display process. First, by the function of the offset line obtaining module 21a, the control part 20 obtains offset lines O (step S100). Namely, as shown in FIG. 2A, the control part 20 obtains a road line R including a plurality of line segments L that connect road points P obtained by plotting nodes or shape interpolation points on a map, and obtains offset lines O which are lines obtained by parallelly moving each of the plurality of line segments L a certain offset distance Y in a direction perpendicular to the line segment L. Note that the control part 20 obtains offset lines O for at least those sections of the road line R where characters are to be arranged.

Then, by the function of the reference line obtaining module 21b, the control part 20 sets link straight lines e1 to e3 (step S105). Namely, as shown in FIGS. 2B and 2C, when two offset lines O do not intersect each other, the control part 20 sets a link graphic H and links the two offset lines O by the link graphic H. Specifically, the control part 20 sets a center G of the link graphic H at a road point P which is a point of intersection of line segments L which are offset sources of the two offset lines O linked by the link graphic H. In addition, the control part 20 sets the link graphic H such that the length of a perpendicular dropped from the center G to each side is the offset distance Y. Then, the control part 20 cuts off the offset lines O and the link graphic H at points of intersection thereof, and discards a portion of the offset lines O inside the link graphic H and one of two cut-off portions of the link graphic H closer to the road line R. Straight lines that form a portion of the link graphic H remaining without being discarded serve as link straight lines e1 to e3.

Note, however, that in step S105 the following exceptional process is performed. Specifically, when two consecutive offset lines O originally intersect each other, the control part 20 links the two offset lines O at a point of intersection of the two offset lines O. In addition, when two consecutive offset lines O do not originally intersect each other and an initial angle θ formed by the two offset lines O is less than or equal to an interior angle α of the link graphic H, the control part 20 links the two offset lines O by extended lines U of the two offset lines O. In step S105, of all offset lines O, a pair of two consecutive offset lines O which is a processing target is selected in turn, and the pair of two consecutive offset lines O is linked together one after another.

Then, by the function of the reference line obtaining module 21b, the control part 20 obtains a reference line K (step S110). Namely, as shown in FIG. 2C, the control part 20 obtains a reference line K by combining together a part of the offset lines O and a part of the link graphic H (link straight lines e1 to e3) that remain without being discarded. Note that, when two consecutive offset lines O originally intersect each other, the control part 20 cuts off the offset lines O at a point of intersection of the two offset lines O, and discards cut-off end portions.

Then, by the function of the reference line obtaining module 21b, the control part 20 arranges characters on the reference line K (step S115). Namely, as shown in FIG. 4B, the control part 20 arranges text images T1 to T4 such that the spacings between center points C1 to C4 on the reference line K are spacings D1 to D3. In addition, the control part 20 arranges the text images T1 to T4 in directions such that the directions of bases (directions V1 to V4 of the characters)

coincide with the directions of portions of the reference line K at the center points C1 to C4.

When the correction of the directions V1 to V4 of the respective characters is completed, by the function of the display control module 21d, the control part 20 displays a map (step S140). Namely, the control part 20 renders a map including the road line R and the text images T1 to T4, and displays the map on the touch panel display. By this, a route name represented by the text images T1 to T4 can be displayed along the road line R.

(3) Other Embodiments

Figure 5A:
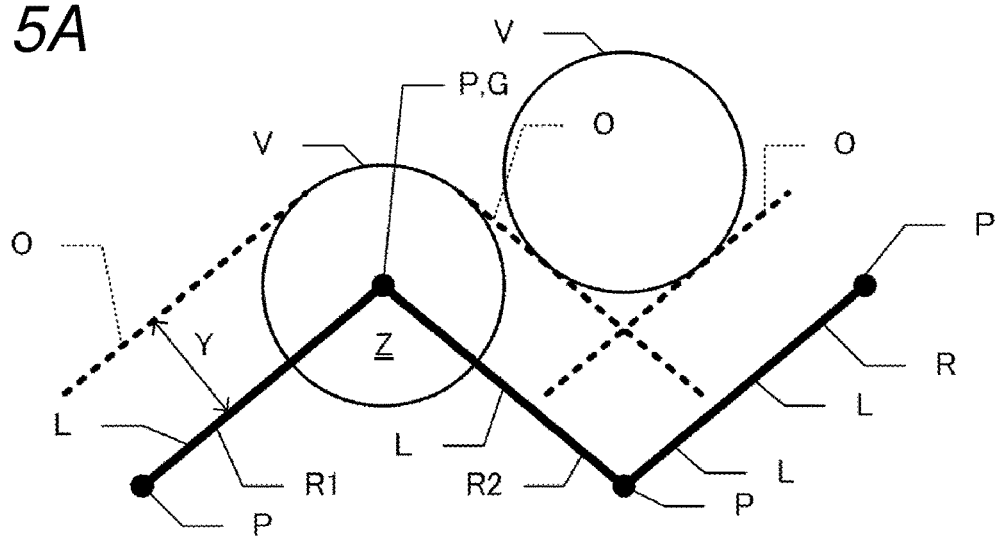
FIGS. 5A to 5C are examples of a map of other embodiments.
Figure 5B:
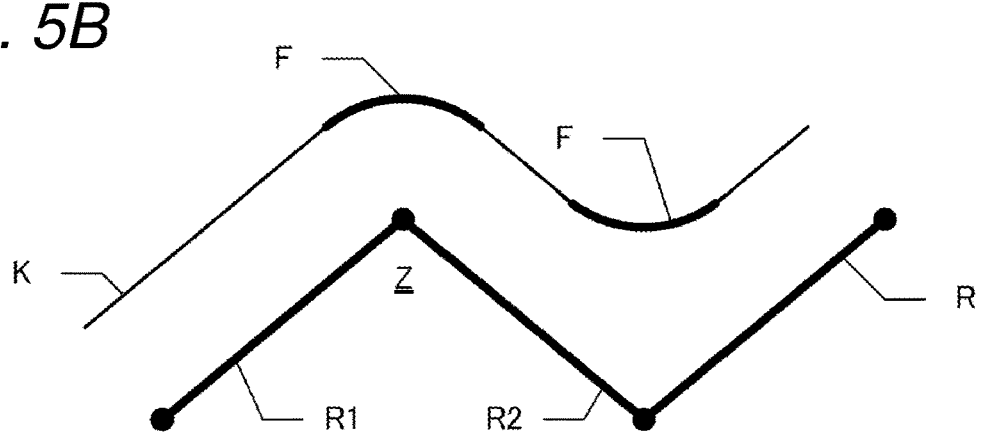

By the function of the reference line obtaining module 21b, the control part 20 may obtain such a reference line K that a first road line segment R1 and a second road line segment R2 which form a road line R are linked by a link curve which is a part of the circumference of a circle or an ellipse in contact with the first road line segment R1 and the second road line segment R2, at a connecting portion Z to which the first road line segment R1 and the second road line segment R2 are connected. Specifically, the control part 20 may obtain such a reference line K that two consecutive offset lines O are linked by a link curve which is a part of the circumference of a circle or an ellipse in contact with the two offset lines O. FIGS. 5A and 5B are maps for describing a reference line K according to the present embodiment. When two consecutive offset lines O do not intersect each other like the first and second offset lines O from the left in FIG. 5A, the control part 20 obtains a link circle V that has a center at a road point P which is a point of intersection of line segments L which are offset sources of the two offset lines O and that is in contact with each of the two offset lines O. On the other hand, when two consecutive offset lines O intersect each other like the first and second offset lines O from the right in FIG. 5B, the control part 20 obtains a link circle V that has a center on the opposite side of the two offset lines O from a road line R and that is in contact with each of the two offset lines O. In either case, the radius of the link circle V is an offset distance Y.

When two consecutive offset lines O do not intersect each other like the first and second offset lines O from the left in FIG. 5A, by the function of the reference line obtaining module 21b, the control part 20 cuts off the two consecutive offset lines O and the link circle V at points of contact therebetween, and discards one of two cut-off portions of the link circle V closer to the road line R. On the other hand, when two consecutive offset lines O intersect each other like the first and second offset lines O from the right in FIG. 5A, by the function of the reference line obtaining module 21b, the control part 20 cuts off the two consecutive offset lines O and the link circle V at points of contact therebetween, and discards one of two cut-off portions of the link circle V farther from the road line R and portions of the cut-off offset lines O closer to the road line R than the points of contact with the link circle V. Then, as shown in FIG. 5B, by the function of the reference line obtaining module 21b, the control part 20 combines together parts of the offset lines O and parts of the link circles V that remain without being discarded, and thereby obtains a reference line K. The reference line K is a continuous line along the road line R. As a result, two consecutive offset lines O are linked by a link curve F which is a part of the link circle V.

Figure 5C:
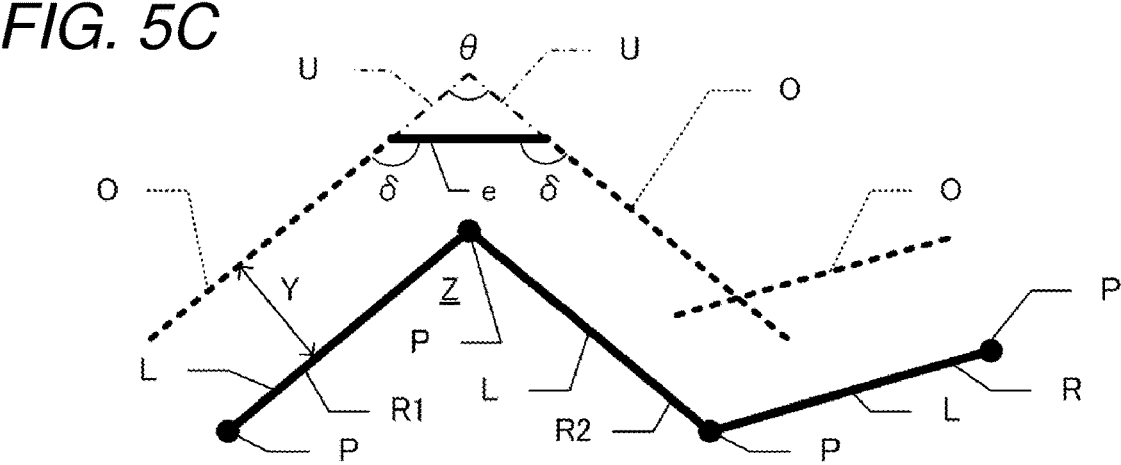

In the present embodiment, since the link curve F is a curve that is in contact with two offset lines O, the two offset lines O can be linked while a direction is changed smoothly. In particular, since the offset lines O are tangent to the link curve F, changes in direction at connecting points between the offset lines O and the link curve F can be suppressed. Therefore, differences between the directions of a plurality of characters arranged in the directions of corresponding portions of the reference line K can be suppressed. Hence, appearance and readability can be improved. As shown in FIGS. 5A to 5C, a link curve F having a direction between the direction of a first road line segment R1 and the direction of a second road line segment R2 can be set at a connecting portion Z where the first road line segment R1 and the second road line segment R2 are connected. Therefore, a third character can be arranged in the direction of the link curve F between a first character arranged in the direction of the first road line segment R1 and a second character arranged in the direction of the second road line segment R2. The direction of the third character is a direction between the direction of the first road line segment R1 and the direction of the second road line segment R2. Hence, appearance and readability can be improved.

Here, two consecutive offset lines O may be linked by an ellipse instead of a link circle V. In the present embodiment, when two consecutive offset lines O intersect each other like the first and second offset lines O from the right in FIG. 5A, too, the two offset lines O may not be linked by a link curve F. In addition, in the first embodiment, when two consecutive offset lines O intersect each other, too, the two offset lines O may be linked by a link graphic H which is a regular polygon.

Furthermore, at least one link straight line is set. FIG. 5C is a diagram showing that only one link straight line e is set. As shown in the drawing, the control part 20 obtains such a reference line K that ends of the two offset lines O are linked by the one link straight line e. Two bending angles δ sandwiched between the link straight line e and the offset lines O have the same magnitude, and have equal shift angles relative to 180 degrees (180−δ [degrees]). In addition, when N bending angles δ are formed for two consecutive offset lines O, the control part 20 may set the shift angle relative to 180 degrees for the bending angle δ (180−δ [degrees]) to a magnitude obtained by dividing the shift angle relative to 180 degrees for an initial angle θ (180−θ [degrees]) into N equal parts.

In addition, the center G of the link graphic H or link circle V does not necessarily need to be located at a road point P which is a point of intersection of line segments L which are offset sources of two consecutive offset lines O. In addition, the link graphic H does not necessarily need to be a regular polygon that circumscribes a circle whose radius is the offset distance Y. The link graphic H may be set in a direction such that two bending angles β sandwiched between each of the link straight lines e1 and e3 at ends and the offset lines O are equal to each other.

A technique for arranging a third character in a third direction is not limited to the one described above as long as, by the function of the arrangement module 21c, the control part 20 arranges, at a connecting portion Z where a first road line segment R1 and a second mad line segment R2 are connected, the third character in the third direction which is a direction between a first direction which is a direction for the first road line segment R1 and a second direction which is a direction for the second road line segment R2, between a first character arranged in the first direction and a second character arranged in the second direction, the first road line segment R1 and the second road line segment R2 forming a road line R. For example, by the function of the arrangement module 21c, the control part 20 may arrange the first character, the second character, and the third character such that differences between the directions of consecutive characters at the connecting portion Z are equal.

Figure 6A:
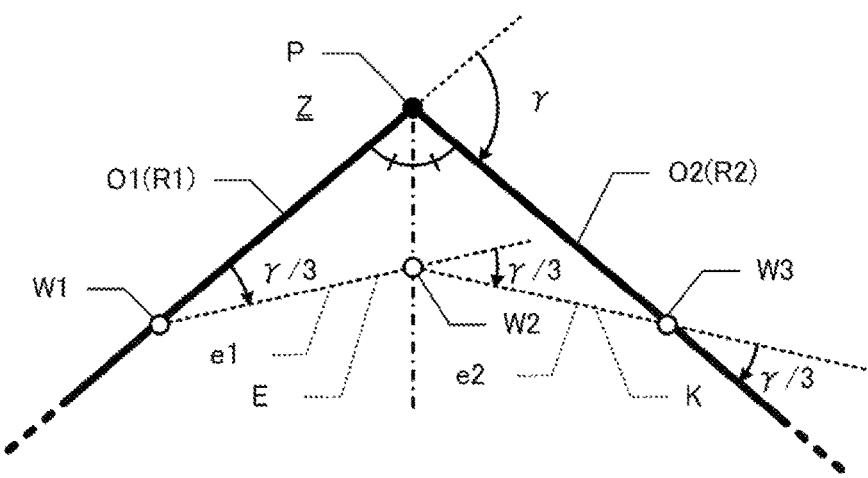
FIGS. 6A and 6B are examples of a map of other embodiments.

For example, the control part 20 may arrange the first character, the second character, and the third character such that differences between the directions of consecutive characters at the connecting portion Z are equal, by setting a reference line K such that bending angles are equal. FIG. 6A shows a state in which a reference line K is set such that bending angles are equal. In the drawing, there is shown a connecting portion Z where two consecutive offset lines O1 and O2 are connected. Note that the directions of the offset lines O1 and O2 can be regarded in the same manner as the directions of road line segments R1 and R2 of a road line R which are offset sources. The direction of the offset line O2 is a direction changed by a change angle $\gamma$ from the direction of the offset line O1.

The control part 20 obtains a divided angle $\gamma/3$ by dividing the change angle $\gamma$ (0 degrees<$\gamma$<180 degrees) into three equal parts, and sets such a link straight line e1 (broken line) that a direction changes from the offset line O1 to the side of the offset line O2 by the divided angle $\gamma/3$ at a bending point W1 on the offset line O1. Furthermore, the control part 20 sets a bending point W2 on the link straight line e1, and sets such a link straight line e2 (broken line) that a direction changes from the link straight line e11 to the side of the offset line O2 by the divided angle $\gamma/3$ at the bending point W2. Furthermore, the control part 20 sets a bending point W3 at a point of intersection of the link straight line e2 and the offset line O2, and thereby sets a link line E that bends at the three bending points W1 to W3. At the bending point W2, the direction of the offset line O2 is a direction changed by the divided angle $\gamma/3$ from the link straight line e2.

As described above, by setting a reference line K and arranging characters in directions of corresponding portions of the reference line K, differences between the directions of consecutive characters at a connecting portion Z can be equalized. The expression "differences between the directions of consecutive characters at a connecting portion Z are equalized" means that of differences between the directions of consecutive characters at the connecting portion Z, those differences greater than 0 degrees are equalized. For example, consecutive characters whose difference in direction is the divided angle $\gamma/3$ and consecutive characters whose difference in direction is 0 degrees may be all present at the connecting portion Z. Namely, two or more characters may be arranged on at least one of the link straight lines e1 and e2 set as described above.

In the present embodiment, by setting the bending point W2 on a bisector of an angle formed by the offset lines O1 and O2, distances between the consecutive bending points W1 to W3 can be equalized. The distances between the consecutive bending points W1 to W3 may be set, for example, to be nearly equal to the widths of the text images T1 to T4. Needless to say, the distances between the consecutive bending points W1 to W3 do not need to be equal. Furthermore, the divided angle at each of the bending points W1 to W3 does not need to be 1/a natural number of the change angle $\gamma$. In addition, the number of bending points may be increased by increasing the number of natural numbers into which the change angle $\gamma$ is divided equally, as the change angle $\gamma$ increases.

In addition, the control part 20 does not necessarily need to set a reference line K, and may arrange a third character in a third direction which is a direction between a first direction for a first road line segment R1 and a second direction for a second road line segment R2, between a first character arranged in the first direction and a second character arranged in the second direction, and on a road line R or offset lines O without setting a reference line K. For example, the control part 20 may arrange a first character, a second character, and a third character on a road line R or offset lines O in the directions of corresponding portions of the road line R or the offset lines O. and then correct the direction of the third character such that the direction is between the directions of the first character and the second character.

Figure 6B:
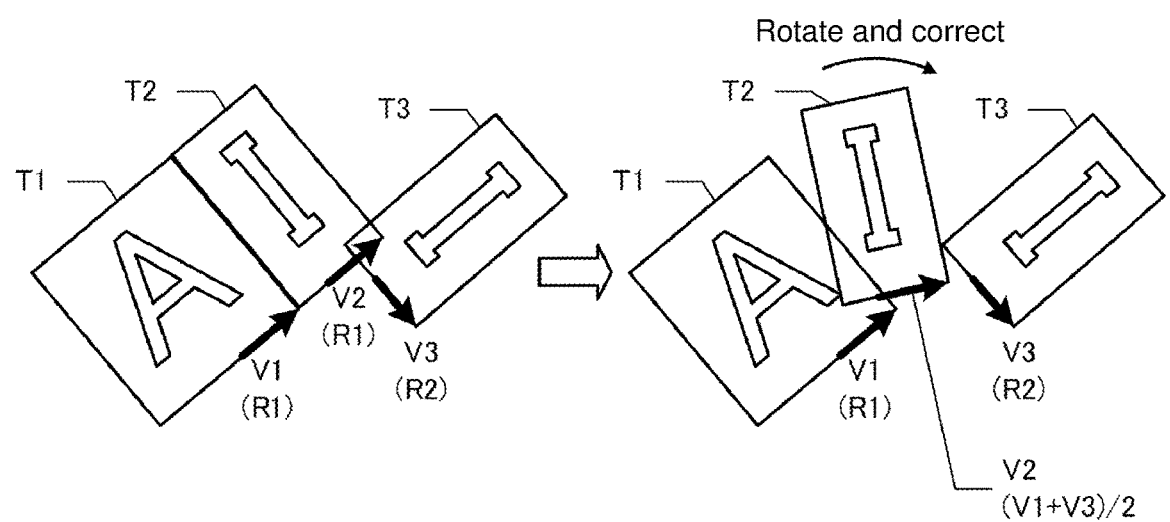

FIG. 6B shows a state in which the direction of a third character is corrected. On the left side in the drawing, a first character (T1) and a second character (T3) are arranged in their respective directions (V1 and V3). It is assumed that the directions (V1 and V3) of the first character (T1) and the second character (T3) are the directions of a first road line segment R1 and a second road line segment R2, respectively. The control part 20 rotates and corrects a third character (T2) present between the first character (T1) and the second character (T3) such that a direction (V2) of the third character (T2) is an average direction between the directions (V1 and V3) of the first character (T1) and the second character (T3). As such, even without presetting a reference line K, the third character can be arranged in the third direction which is a direction between the first direction and the second direction. Note that the direction of the third character (T2) does not necessarily need to be an average direction as long as the direction is between the direction of the first character (T1) and the direction of the second character (T3).

In the exemplary embodiments, a road line representing a road shape is a polyline that links a plurality of points on a road by line segments, and may be a line that is offset from the polyline representing the road shape. The points on the road may be points set at the center in a width direction of the road, and may be nodes set at intersections or may be shape interpolation points set on the road other than intersections. The road line is not limited to one representing a road shape obtained when a road is viewed from vertically above, and may be one representing a bird's-eye-view road shape obtained when a road is viewed from diagonally above. The expression "a line segment is offset" means that a line segment is parallelly moved a preset offset distance in a direction perpendicular to an original line segment on a plane of a map. The offset distance may be set according to the size of characters, scale, or a user operation. For example, the offset distance may be set to such a distance that characters and a road line are not displayed in an overlapping manner on a map.

The first road line segment and the second road line segment refer to two line segments of the road line that are connected to a common point (a node, a shape interpolation point, etc.). The first road line segment and the second road line segment may be two offset lines (or extended lines thereof) that are offset from two line segments connected to a common point.

A reference line is formed by linking the first road line segment and the second road line segment through one or more link straight lines. When the first road line segment and the second road line segment are linked through one link straight line, the reference line has a bending angle sandwiched between the first road line segment and the one link straight line and a bending angle sandwiched between the one link straight line and the second road line segment (two bending angles in total). In addition, when the first road line segment and the second road line segment are linked through two link straight lines, the reference line has a bending angle sandwiched between the first road line segment and the first link straight line, a bending angle sandwiched between the first link straight line and the second link straight line, and a bending angle sandwiched between the second link straight line and the second road line segment (three bending angles in total).

Here, at least one link straight line is formed, but by increasing the number of link straight lines, the magnitudes of individual bending angles can be reduced. For example, the reference line obtaining part may set a link straight line such that the shift angle relative to 180 degrees for each bending angle is an angle obtained by equally dividing the shift angle relative to 180 degrees for an angle formed by the first road line segment and the second road line segment. The expression "a plurality of characters are arranged on the reference line in certain directions with respect to the reference line" means that a plurality of characters are arranged such that angles formed by each of the directions of the plurality of characters and the direction of a corresponding portion of the reference line are constant. The directions of the characters may be, for example, the longitudinal directions of the characters or the transverse directions of the characters. The constant angles formed by the directions of the characters and the directions of corresponding portions of the reference line may be, for example, set to 0 degrees or set to 90 degrees. Furthermore, the characters may be arranged such that the direction of each character is tilted by 30 degrees with respect to the direction of a corresponding portion of the reference line.

In addition, the reference line obtaining part may set a regular polygon that links the first road line segment and the second road line segment by its outline. By this, the magnitudes of two or more bending angles sandwiched between link straight lines can be equalized, enabling to equally distribute changes in the direction of the reference line. In addition, when an angle formed by the first road line segment and the second road line segment is closer to 180 degrees than an interior angle of the regular polygon, a plurality of characters may be arranged directly on the first road line segment and the second road line segment without obtaining a reference line. In addition, it is desirable that the number of vertex angles of the regular polygon be large because the bending angles of the reference line can be brought close to 180 degrees. The number of vertex angles of the regular polygon may be, for example, eight or other than eight. In addition, the number of vertex angles of the regular polygon may be set such that the interior angles of the regular polygon are closer to 180 degrees than an angle formed by the first road line segment and the second road line segment.

In addition, the reference line may be formed by linking the first road line segment and the second road line segment by a link curve which is a part of the circumference of a circle or an ellipse in contact with the first road line segment and the second road line segment. Needless to say, the reference line may be formed by linking consecutive first and second road line segments by a curve which is not a part of the circumference of a circle or an ellipse in contact with the first and second road line segments.

Furthermore, a technique for arranging characters so as to suppress changes in direction as in the exemplary embodiments is also applicable as a program or a method. In addition, a system, a program, and a method such as those described above may be implemented as a single apparatus, or may be implemented by using parts shared with parts included in a vehicle, and thus include various modes. For example, it is possible to provide a navigation system, a map display system, method, and program including an apparatus such as that described above. In addition, changes can be made as appropriate. e.g., a part is software and a part is hardware. Furthermore, the aspects can be embodied to serve as a recording medium for a program that controls an apparatus. Needless to say, the recording medium for software may be a magnetic recording medium or a magneto-optical recording medium, or even any recording medium to be developed in the future can also be considered exactly in the same manner.

REFERENCE SIGNS LIST

10: Navigation system, 20: Control part, 21: Navigation program, 21*a*: Offset line obtaining module, 21*b*: Reference line obtaining module, 21*c*: Arrangement module, 21*d*: Display control module, 30: Recording medium, 30*a*: Map information, 41: GPS receiving part, 42: Vehicle speed sensor, 43: Gyro sensor, 44: User I/F part. C1 to C4: Center point. E: Link line. F: Link curve, G: Center, H: Link graphic, J: Center line, K: Reference line, L: Line segment, O: Offset line, P: Road point, $Q_1$: Point of contact, R: Road line, T1 to T4: Text image, U: Extended line, V: Link circle, V1 to V4: Direction, Y: Offset distance, e: Link straight line, $\alpha$, $\beta$, and $\delta$: Bending angle, and $\theta$: Initial angle

The invention claimed is:

1. A map display system that arranges a plurality of characters along a road line, the road line being a polyline representing a road shape, the map display system comprising:
    an arranging part that arranges, at a connecting portion where a first road line segment and a second road line segment are connected, a third character in a third direction between a first character arranged in a first direction and a second character arranged in a second direction, the first direction being a direction for the first road line segment, the second direction being a direction for the second road line segment, the third direction being a direction between the first direction and the second direction, and the first road line segment and the second road line segment forming the road line,
    a display control part that displays the road line and the plurality of characters on a display part; and
    a reference line obtaining part that obtains a reference line based on an offset distance, the reference line being offset by the offset distance from a polyline formed by linking the first road line segment and the second road line segment through one or more link line segments, wherein
    the first direction and the second direction are directions for the first road line segment and the second road line segment, respectively, and the third direction is a direction for the link segment, and
    the display control part displays the plurality of characters over the reference line.

2. The map display system according to claim 1, wherein the reference line obtaining part sets the link line segment such that each of two or more bending angles of the reference line is closer to 180 degrees than an angle formed by the first road line segment and the second road line segment.

3. The map display system according to claim 2, wherein the reference line obtaining part sets an outline of a regular polygon as the link line segment, the regular polygon linking the first road line segment and the second road line segment.

4. The map display system according to claim 2, wherein the arranging part arranges the first character, the second character, and the third character such that differences between directions of consecutive characters at the connecting portion are equal.

5. The map display system according to claim 1, wherein the arranging part arranges the first character, the second character, and the third character such that differences between directions of consecutive characters at the connecting portion are equal.

6. The map display system according to claim 1, wherein the arranging part arranges the first character, the second character, and the third character such that differences between directions of consecutive characters at the connecting portion are equal.

7. A map display system that arranges a plurality of characters along a road line, the road line being a polyline representing a road shape, the map display system comprising:
   a reference line obtaining part that obtains such a reference line that a first road line segment and a second road line segment are linked by a link curve at a connecting portion where the first road line segment and the second road line segment are connected, the first road line segment and the second road line segment forming the road line, and the link curve being a part of a circumference of a circle or an ellipse in contact with the first road line segment and the second road line segment;
   an arranging part that arranges the plurality of characters on the reference line in certain directions with respect to the reference line; and
   a display control part that displays the road line and the plurality of characters on a display part.

8. A map display program stored on a non-transitory computer readable medium that allows a computer to implement a function of arranging a plurality of characters along a road line, the road line being a polyline representing a road shape, the map display program causing the computer to function as:
   an arranging part that arranges, at a connecting portion where a first road line segment and a second road line segment are connected, a third character in a third direction between a first character arranged in a first direction and a second character arranged in a second direction, the first direction being a direction for the first road line segment, the second direction being a direction for the second road line segment, the third direction being a direction between the first direction and the second direction, and the first road line segment and the second road line segment forming the road line;
   a display control part that displays the road line and the plurality of characters on a display part; and
   a reference line obtaining part that obtains a reference line based on an offset distance, the reference line being offset by the offset distance from a polyline formed by linking the first road line segment and the second road line segment through one or more link line segments, wherein
   the first direction and the second direction are directions for the first road line segment and the second road line segment, respectively, and the third direction is a direction for the link line segment, and
   the display control part displays the plurality of characters over the reference line.

9. A map display program stored on a non-transitory computer readable medium that allows a computer to implement a function of arranging a plurality of characters along a road line, the road line being a polyline representing a road shape, the map display program causing the computer to function as:
   a reference line obtaining part that obtains such a reference line that a first road line segment and a second road line segment are linked by a link curve at a connecting portion where the first road line segment and the second road line segment are connected, the first road line segment and the second road line segment forming the road line, and the link curve being a part of a circumference of a circle or an ellipse in contact with the first road line segment and the second road line segment;
   an arranging part that arranges the plurality of characters on the reference line in certain directions with respect to the reference line; and
   a display control part that displays the road line and the plurality of characters on a display part.

* * * * *